(12) United States Patent
Maeckel et al.

(10) Patent No.: US 7,805,329 B2
(45) Date of Patent: Sep. 28, 2010

(54) DEVELOPMENT OF ACTUAL RISK COSTS BASED ON ESTIMATED RISK COSTS AS WELL AS PROBABILISTIC RESTRICTION OF THE ACTUAL RISK COSTS

(75) Inventors: Oliver Maeckel, Heimstetten (DE); Ariane Sutor, Graefelfing (DE)

(73) Assignee: Siemens Aktiengesellschaft, Munich (DE)

( * ) Notice: Subject to any disclaimer, the term of this patent is extended or adjusted under 35 U.S.C. 154(b) by 740 days.

(21) Appl. No.: 11/681,540

(22) Filed: Mar. 2, 2007

(65) Prior Publication Data
US 2007/0214027 A1 Sep. 13, 2007

(30) Foreign Application Priority Data
Mar. 2, 2006 (DE) .................. 10 2006 009 727

(51) Int. Cl.
*G06F 17/50* (2006.01)
(52) U.S. Cl. ...................................... 705/10
(58) Field of Classification Search ............ 705/7, 705/10
See application file for complete search history.

(56) References Cited
U.S. PATENT DOCUMENTS
2003/0139993 A1\* 7/2003 Feuerverger .................. 705/36
2003/0154150 A1\* 8/2003 Wefers et al. ................. 705/36
2004/0044505 A1\* 3/2004 Horwitz ........................ 703/3
2005/0075970 A1\* 4/2005 Doyle ........................... 705/38

OTHER PUBLICATIONS

Garrick et al.; Probabilistic Risk Assessment Practices In The USA For Nuclear Power Plants; Oct. 9, 2001; Safety Science; vol. 40, Issues 1-4; pp. 177-201.*
Blough et al.; Modeling Risk Using Generalized Linear Models; May 31, 1997; Journal of Health Economics; vol. 18, Issue 2; pp. 153-171.*
Dillon et al.; Programmatic Risk Analysis For Critical Engineering Systems Under Tight Resource Constraints; Apr. 2001; Operations Research; vol. 51, No. 3; pp. 354-370.*
Accola; Assessing Risk and Uncertainty in New Technology Investments; Sep. 1994; American Accounting Association; vol. 8, No. 3; pp. 19-35.*
Kari Känsälä; "Integrating Risk Assessment with Cost Estimation"; IEEE Software, vol. 14, Issue 3, 1997, pp. 61-67.

\* cited by examiner

*Primary Examiner*—Susanna M Diaz
*Assistant Examiner*—Ashley Y Chou
(74) *Attorney, Agent, or Firm*—Staas & Halsey LLP

(57) ABSTRACT

An evaluation is performed for a device, an application and/or a method, in particular a method for establishing a technical system such as a power plant for instance, the assessment being carried out on the basis of costs for risks. In accordance with the method, the costs for specific risks are to be assessed. A risk costs interval is to be determined, which contains the actual risk costs with high probability. This is achieved by a regression of intuitive assignments to a straight line by an indirect linear regression by a non-linear regression in an intermediate diagram.

8 Claims, 3 Drawing Sheets

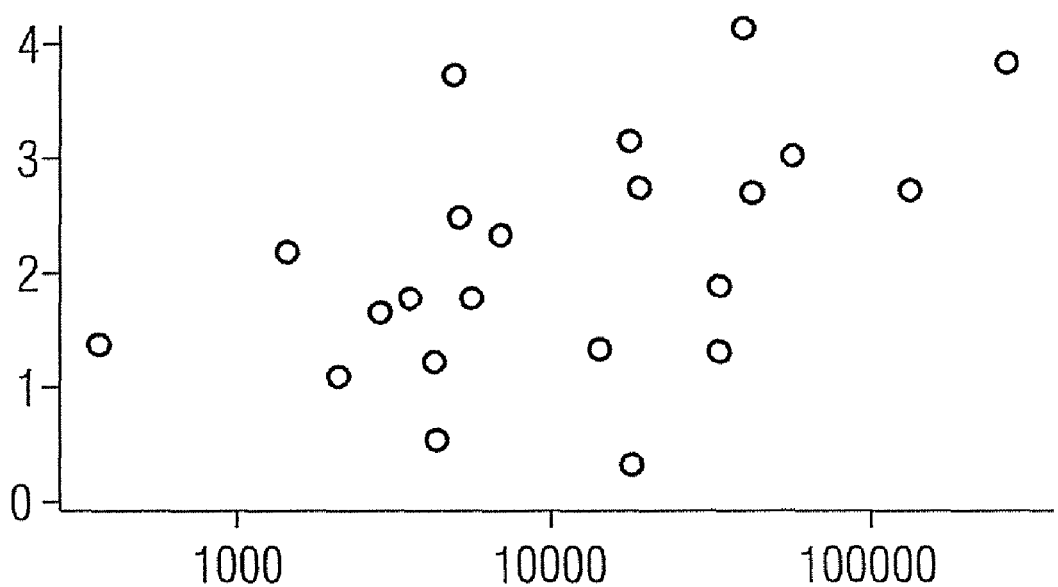

DEVELOPMENT OF ACTUAL RISK COSTS BASED ON ESTIMATED RISK COSTS AS WELL AS PROBABILISTIC RESTRICTION OF THE ACTUAL RISK COSTS

CROSS REFERENCE TO RELATED APPLICATIONS

This application is based on and hereby claims priority to German Application No. 10 2006 009 727.0 filed on Mar. 2, 2006, the contents of which are hereby incorporated by reference.

BACKGROUND

Described below is a method for evaluating a device, an application and/or a method, in particular a method for establishing a technical system such as a power plant for instance, the assessment being carried out on the basis of costs for risks.

One objective of risk analysis is to derive the risk costs of the determined risks in monetary units, in Euros or Dollars for instance. As a result, the sum of the risk costs is determined. The risk costs are however not always estimated accurately. The aim is to specify the upper limits for the sum of the risk costs as well as the probabilities with which the risk costs remain below the specified limits.

SUMMARY

Analysis of a technical system, for instance a device, an application and/or method, in particular a method for establishing a technical system such as for instance a power plant, is performed on the basis of costs for specific risks. A risk costs interval is to be determined, which contains the actual risk costs with high probability. Basically, all negative influences constitute risks relating to establishing a technical system for instance.

The method described below determines the upper limits for the sum of the risk costs assumes that the determined risk costs are susceptible to errors. The individual errors are random and exhibit a standard distribution. Risks are plausibilized by requesting an intuitive risk assessment. In a two-dimensional plausibilization diagram, the risks are assigned to intuitive risk assessment numbers in accordance with the logarithm of their risk in monetary units (Euro for instance). In the plausibilization diagram, these intuitive assignments are reproduced in a risk costs to risk costs assessment number coordinate system having a risk costs axis with a decadic logarithmic scale and a risk costs assessment number axis having a linear scale. In this way, the risk costs are preferably plotted on an x-axis and the risk costs assessment numbers on a y-axis. The expectation now is that the actual risk costs not susceptible to errors lie on a straight line. A regression of the estimated risk costs now takes place on a straight line of this type. The regression line of the actual risk costs allows the actual overall risk costs to be determined from the sum of the actual risk costs. Probabilities of this type are assigned to an upper limit of the actual risk costs sum such that the actual risk costs sum remains below this upper limit, on the assumption that the risk costs sum exhibits a probability distribution, in particular a normal distribution, such that quantiles can be calculated on this basis.

In statistical terms, a p-quantile for a probability density to the real numbers is referred to as that real number, for which the (cumulated) distribution function assumes the value of p. The observations or the population are then less than or equal to the p-quantile with a probability pf p. The observation or the population respectively is now the actual risk costs sum.

A straight regression line is first determined, which can likewise be referred to as a plausibilization line. This results in a good possibility of graphically displaying the accuracy of the determined risk data and thus a possibility of visual examination. Secondly, the upper limits and probabilities are determined for the sum of the risk costs. This allows statements of the type "it is 99% probable that the sum of the risk costs remains below a specified value" and thus upwards estimations of the risk costs. Furthermore, the deviation of the upper limits from the risk costs determined a priori allows statements relating to the accuracy of the first estimations.

The individual risks are to be regarded as being susceptible to random errors, these errors are to be regarded as being stochastically distributed, in particular as normally distributed, a regression, in particular a non-linear regression, is to be to carried out, the function determined in this way is to be entered as a plausibilization line in the plausibilization diagram, the distribution of the sum of the risk costs is to be derived and the upper limits for the specified probabilities are to be calculated therefrom.

A regression is implemented by an indirect linear regression by a non-linear regression in an intermediate diagram. The distortions of the risk costs occurring with a direct linear regression can hereby be avoided on the basis of the logarithmic scaling of the risk costs.

According to an advantageous embodiment, the risk costs are plotted in the intermediate diagram along a y-axis forming a linear scale, and the original intuitive risk costs assessment numbers are plotted along an x-axis forming a linear scale.

In accordance with a further advantageous embodiment, the non-linear regression function is an exponential function with a basis, in particular with a basis 10, and a linear y-axis $ax+b$.

According to a further advantageous embodiment, the values a and b are determined by minimizing the quadrats of the intervals between the determined actual risk costs values and the exponential function.

According to a further advantageous embodiment, the inverse function of the non-linear regression function, in particular the exponential function, is formed, and a back transformation of the inverse function is carried out in the risk costs to risk costs assessment number coordinate system having a risk costs axis with a decadic logarithmic scale and a risk costs assessment number axis with a linear scale, with a straight line determined by the values a and b being determined with the straight line function $ax+b$.

If a direct linear regression is carried out in the plausibilization diagram, distortions of deviations of the risk costs result to the left and to the right are produced because of the logarithmic scale. With a direct linear regression, the values c and d of a straight line function $cx+d$ are determined by minimizing the quadrats of the intervals between the determined actual risk costs values and a direct straight line in the risk costs to risk costs assessment number coordinate system, having a risk costs axis with a decadic logarithmic scale and a risk costs assessment axis with a linear scale.

Risk costs causes are for instance waste from the system to be established, deadline difficulties, currency fluctuations, hours of overtime and/or price increases.

BRIEF DESCRIPTION OF THE DRAWINGS

These and other objects and advantages will become more apparent and more readily appreciated from the following description of the preferred embodiments, taken in conjunction with the accompanying drawings of which:

FIG. 1 is a graph of an assignment in a risk costs coordinate system, risk costs assessment number coordinate system.

DETAILED DESCRIPTION OF EXEMPLARY EMBODIMENTS

Figure 2A:
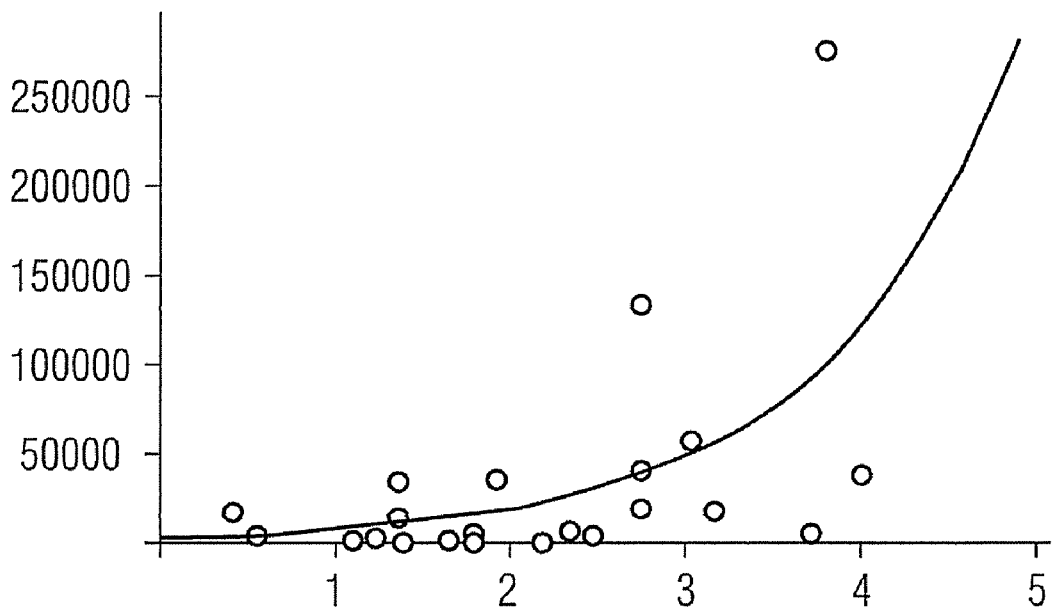
FIGS. 2A and 2B are graphs of a first exemplary embodiment of a non-linear regression.

Reference will now be made in detail to the exemplary embodiments which are illustrated in the accompanying drawings, wherein like reference numerals refer to like elements throughout.

FIG. 1 shows a first diagram of an assignment in a risk costs to risk costs assessment number coordinate system, which can be regarded as a plausibilization diagram. An interval is to be determined, which contains the actual risk costs with high probability. The uncertainty of risks is thus to be better managed. Based on this approach, risk costs causes are determined. Plausibilization through diagonalization. High risk costs correspond to a high intuitive risk assessment. Low costs correspond to a low intuitive risk assessment. Risk costs assessment numbers can now lie in the interval from zero to four for instance. Risk costs can now lie in the interval from zero to one million monetary units for instance. It is assumed here that the actual risk costs lie on a straight line in the plausibilization diagram.

Figure 2B:
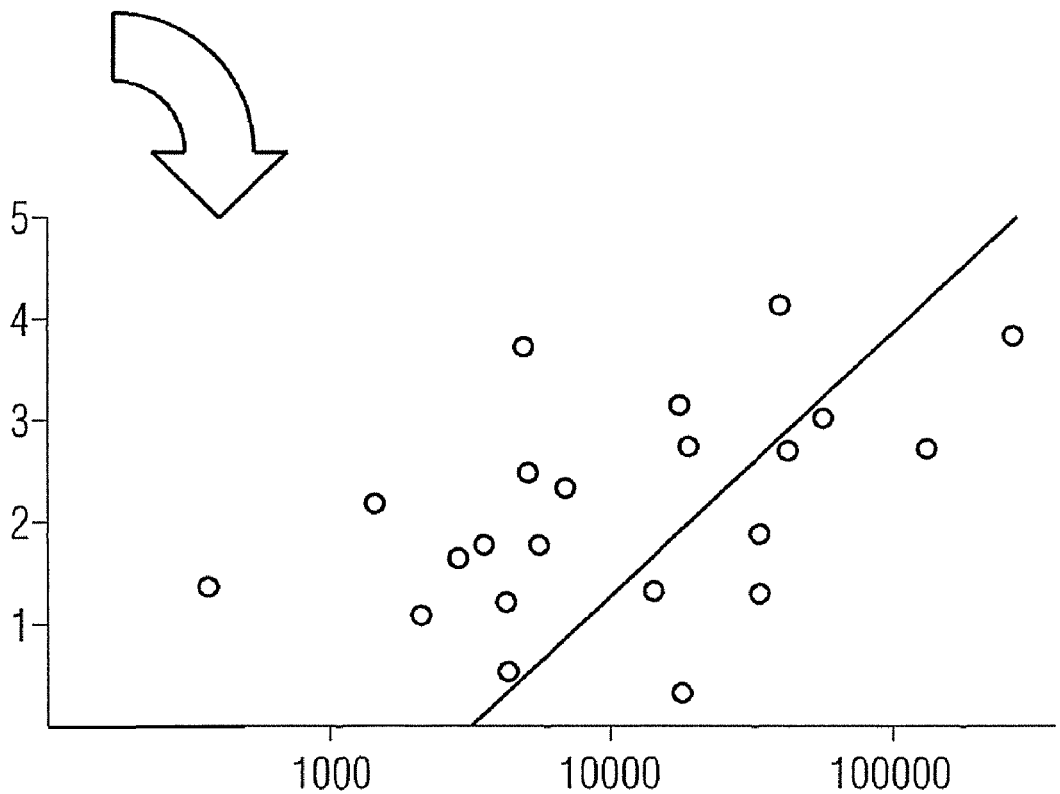

FIGS. 2A and 2B show a first exemplary embodiment of a non-linear regression. It is assumed that normally distributed errors are present. The problem exists that an estimation of the risk costs is inaccurate. An analogy to physics can be seen. False estimations are random, based on estimation errors. The assumption can be made that a false estimation is normally distributed. In this way, the expected value can be assumed as the actual risk costs in the plausibilization diagram on the straight line. The variance denotes the uncertainty of risk costs and is a measure for the deviation from the straight line. The plausibilization line is determined by regression. It is disadvantageous that as a result of linear regression in the plausibilization diagram, upwards and downwards deviations in the risk costs are evaluated identically despite logarithmic scales of the risk costs. This disadvantage can be eliminated by a non-linear regression of the risk costs in Euro in an intermediate diagram according to FIG. 2A and by back transformation in the plausibilization diagram according to FIG. 2B. To this end, parameters a and b are determined in an intermediate diagram according to FIG. 2A with the horizontal axis "intuitive risk assessment" and the vertical axis "risk costs in monetary units", by non-linear regression such that a function of form $10^{ax+b}$ minimizes the sum of the interval quadrats between the risk data and the determined function. In the logarithmic plausibilization diagram according to FIG. 2B, the determined function appears as a straight line.

The distribution of the sum of the risk costs can be determined by way of the distribution assumptions for the individual risk costs. The sought upper limits for this sum and the sought assigned probabilities then result as the quantile of the determined distribution.

The uncertainty in the risk assessment is catered for by calculating upper limits. The distribution of the sum of the risk costs can be calculated by way of the distribution of the individual risks. With what probability does the sum of the risk costs remain below an upper limit?

The following variables are produced by the first exemplary embodiment:

| Quantile: | 80% Var * 0.84 + EW | |
|---|---|---|
| | 99% Var * 2.33 + EW | |
| Sample data: | Amount at risk | 732183 € |
| | EW | 738451 € |
| | 80% quantile | 950232 € |
| | 99% quantile | 1325890 € |

Figure 3A:
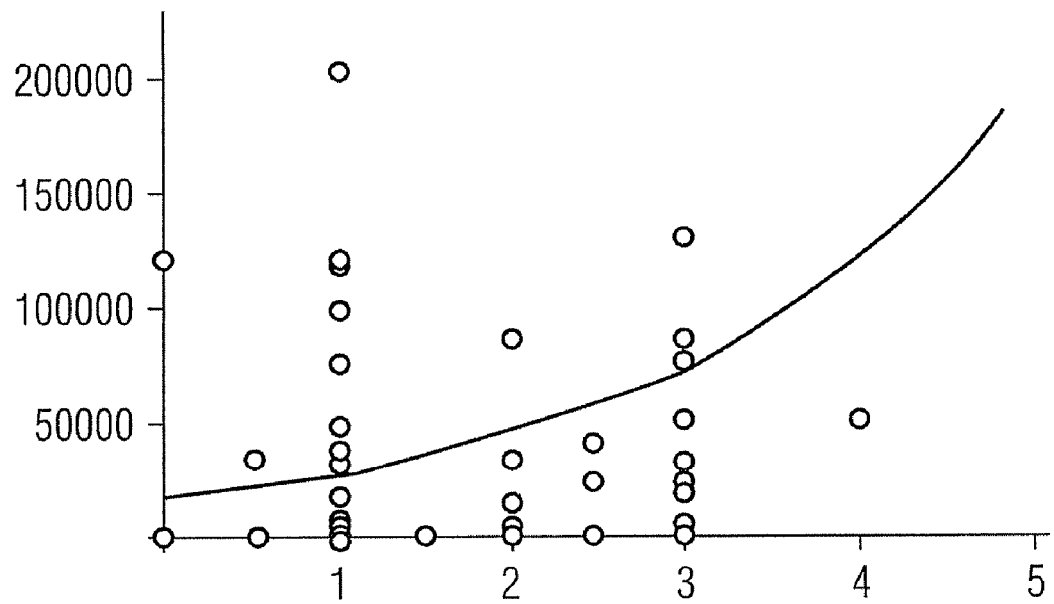
FIGS. 3A and 3B are graphs of a second exemplary embodiment of a non linear regression.
Figure 3B:
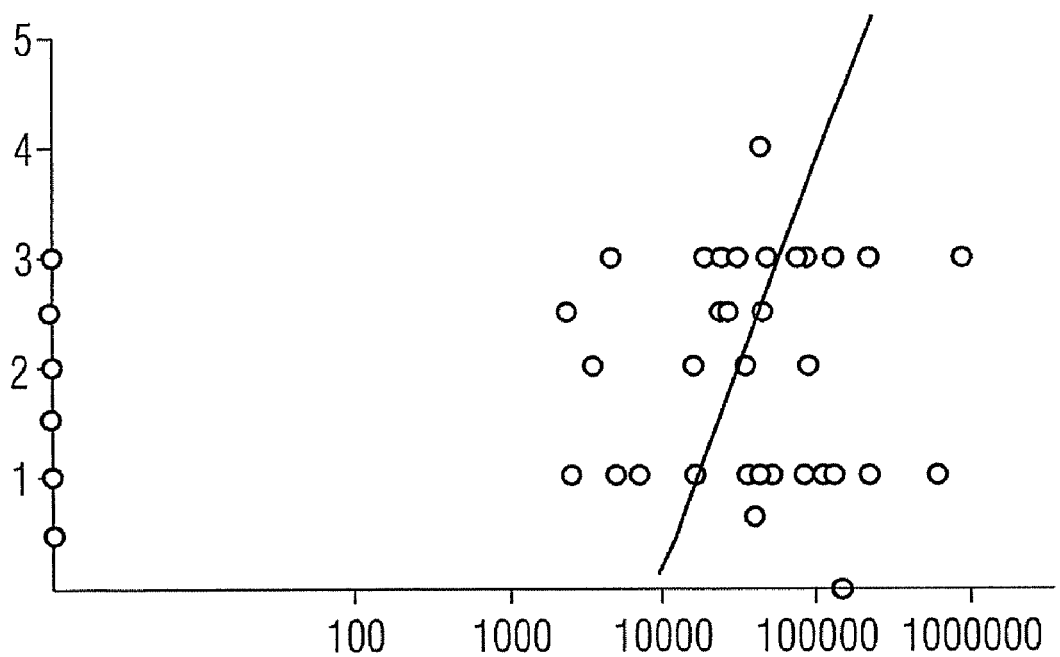

FIGS. 3A and 3B show a second exemplary embodiment of a non-linear regression. The following variables are produced:

| Sample data: | Amount at risk | 3486830 € |
|---|---|---|
| | EW | 3520120 € |
| | 80% quantile | 4436230 € |
| | 99% quantile | 6061230 €. |

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method for evaluating at least one of a device and an application used in a technical system, and a method for establishing the technical system, with an assessment carried out based on costs for risks, comprising:

a calculating device determining risk costs causes in the technical system;

assessing possible risk costs depending on the risk costs causes, intuitively assigning risk cost data values to intuitive risk costs assessment numbers for possible risk costs representing monetary waste of the technical system, respectively, representing said intuitive assigning in an initial physical representation of the costs for risks using a first coordinate system of risk costs to risk costs assessment numbers and having a risk costs axis with a decadic logarithmic scale and a risk costs assessment number axis with a linear scale;

assuming that the risk cost data values have errors randomly and stochastically distributed, in particular normally distributed;

the device determining a variance and an expected value for the possible risk costs based on a probability to determine actual risk cost data values to which are assigned intuitive risk cost assessment numbers, respectively;

the device transforming the initial physical representation of the costs for risks into an intermediate diagram using a second coordinate system of intuitive risk assessment to risk costs in monetary units;

the device implementing regression of the intuitive assigning on a straight regression line by an indirect linear regression using a non-linear regression to produce a curve in the intermediate diagram;

the device reverse transforming the curve in the intermediate diagram back into a straight regression line in the initial physical representation of the costs for risks;

the device determining actual overall risk costs from a sum of the actual risk costs by the straight regression line of the actual risk cost data values in the initial physical representation of the costs for risks after the reverse transforming; and the device assigning a probability such that the sum of the actual risk costs remains below an upper limit, with an assumption that the risk costs sum exhibits a probability distribution, in particular a normal distribution, such that quantiles are calculated for the data representing monetary waste of the technical system.

2. The method as claimed in claim 1, wherein in the intermediate diagram, the risk costs values are plotted along a y-axis forming a linear scale, and the intuitive risk costs assessment numbers are plotted along an x-axis forming a linear scale.

3. The method as claimed in claim 2, wherein the non-linear regression uses an exponential function with a base and a linear exponent ax+b.

4. The method as claimed in claim 3, wherein the base of the exponential function is base 10.

5. The method as claimed in claim 3, further comprising determining values a and b occurring by minimizing quadrats of intervals between determined actual risk costs values and the exponential function.

6. The method as claimed in claim 5, further comprising:
forming an inverse function of the exponential function; and
back transforming the inverse function in a risk costs coordinate system, the risk costs assessment number coordinate system having a risk costs axis with a decade logarithmic scale and a risk costs assessment number axis with a linear scale, with a straight line ax+b determined by the values a and b being determined.

7. The method as claimed in claim 6, wherein said determining determines risk costs causes from the system to be established, deadline difficulties, currency fluctuations, overtime hours and/or price increases.

8. The method as claimed in claim 1, wherein the technical system of claim 1 is a power plant.

* * * * *